US011928777B1

(12) United States Patent
Polyakov et al.

(10) Patent No.: US 11,928,777 B1
(45) Date of Patent: Mar. 12, 2024

(54) USING OPTICAL LABELS IN A VIRTUAL ENVIRONMENT

(71) Applicant: Katmai Tech Inc., New York, NY (US)

(72) Inventors: Petr Polyakov, Tampa, FL (US); Erik Stuart Braund, Saugerties, NY (US)

(73) Assignee: Katmai Tech Inc., New York, NY (US)

( * ) Notice: Subject to any disclaimer, the term of this patent is extended or adjusted under 35 U.S.C. 154(b) by 0 days.

(21) Appl. No.: 18/142,664

(22) Filed: May 3, 2023

(51) Int. Cl.
| G06T 17/00 | (2006.01) |
| G06F 16/955 | (2019.01) |
| G06K 7/14 | (2006.01) |
| G06Q 20/32 | (2012.01) |

(52) U.S. Cl.
CPC .......... *G06T 17/00* (2013.01); *G06F 16/9566* (2019.01); *G06K 7/1447* (2013.01); *G06Q 20/3276* (2013.01)

(58) Field of Classification Search
CPC ....... G06T 19/006; G06T 17/00; G06T 19/20; G06T 2200/04; G06T 2207/30204; G06T 19/003; G06F 3/011; G06F 16/955; G06F 16/9554; G06F 16/9566
See application file for complete search history.

(56) References Cited

U.S. PATENT DOCUMENTS

| 11,386,622 B1* | 7/2022 | Obeyesekere | ........ G06T 19/006 |
| 2016/0321530 A1* | 11/2016 | Troy | ...................... G06Q 10/02 |
| 2018/0343290 A1* | 11/2018 | Gora | .................... G06K 7/1417 |
| 2019/0172221 A1* | 6/2019 | Weller | .................... G06T 17/05 |

* cited by examiner

*Primary Examiner* — Hau H Nguyen
(74) *Attorney, Agent, or Firm* — Sterne, Kessler, Goldstein & Fox P.L.L.C.

(57) ABSTRACT

Disclosed herein is a system that allows for the use of optical labels in a virtual environment. The system and methods generate a virtual optical label with embedded data. A 3D model of an object is rendered for display in a virtual environment, where the 3D model incorporates the virtual optical label. The virtual optical label is displayed on the 3D model in the virtual environment. A scanned image of the virtual optical label is received via a camera application of a mobile computing device. Based on receiving the scanned image, an action is performed based on the embedded data.

20 Claims, 8 Drawing Sheets

USING OPTICAL LABELS IN A VIRTUAL ENVIRONMENT

TECHNICAL FIELD

This field is generally related to virtual/simulated environments.

BACKGROUND

Optical labels, such as barcodes, represent data in a visual, machine-readable format. One type of barcode, known as linear or one-dimensional (1D) barcodes, can represent data by varying the widths and spacing of parallel lines. Another type of barcode, known as matrix codes, two-dimensional (2D) barcodes, or QR codes, use rectangles, dots, hexagons and other patterns to represent data. Optical labels can have data embedded in them. The embedded data may be used in a variety of applications including initiating payment transfers, transferring a user to a website or web page, etc. Optical labels, however, are typically only used in the physical world and/or affixed to products or printed on paper, or on static pages of mobile applications. Such optical labels may be scanned by devices with scanning capabilities or cameras to perform some of the aforementioned functions. For example, after scanning the optical label using a camera application of a mobile phone, a user may be transported to a website (for example taken to a menu for a restaurant or a page to initiate payments). However, other novel uses/applications for optical labels are still to be discovered.

SUMMARY

In aspects, a system, computer-implemented method, and non-transitory computer readable medium including instructions to perform operations are disclosed. The system, method, and operations enable the use of optical labels in virtual environments. Virtual environments refer to a networked application that allows a user to interact with both the computing environment and the work of other users. For example, virtual environments include simulated environments that are generated through computer-generated images (CGI), such as video games, metaverse, augmented reality/virtual reality (AR/VR) environments, virtual conference spaces, etc.

In aspects, the optical labels may be generated by the system. The optical labels may be used in a virtual environment. Throughout this disclosure, these optical labels will also be referred to as virtual optical labels. In aspects, three-dimensional (3D) models can also be rendered by the system to be displayed in a virtual environment. In aspects, the virtual optical labels may be affixed to the 3D models. The 3D models including the virtual optical labels may be displayed in the virtual environment. In aspects, the 3D models may be displayed on graphical user interfaces (GUIs) of client devices, such as laptops, desktops, tablets, mobile phones, interactive/touch video screens, etc.

The virtual optical labels can have data embedded in them. In aspects, the data can include hyperlinks, addresses, user session data, information about the 3D models, payment information, etc. The aforementioned are exemplary and a person of ordinary skill in the art (POSA) reading this disclosure will know what other types of information may be embedded into the virtual optical labels. The embedded data may be static or dynamic. That is the embedded data may be the same or may be updated based on factors and circumstances in the virtual environment or externally. In aspects, the virtual optical labels may be scanned by a user using a device with scanning capabilities or a camera to perform some action(s) based on the embedded data. What actions may be performed will be discussed below.

In aspects, the system, method, and operations can enable performance of the aforementioned functions by first generating a virtual optical label with embedded data. The system can also generate a three-dimensional (3D) model of an object for display in a 3D virtual environment, wherein the 3D model visually incorporates the virtual optical label. The 3D model is rendered to display to a user the virtual optical label within the 3D virtual environment, such that display of the virtual optical label enables the user to scan the virtual optical label with a camera application of a mobile computing device, where the camera application is configured to decode the embedded data from the scanned image and perform an action based on the decoded embedded data. The mobile computing device can include mobile scanners, laptops, mobile phones, tablets, or any other devices equipped with scanners or cameras.

In aspects, the embedded data can include a uniform resource locator (URL), an IP address, an address identifying a destination computing device, or active user session data of a user of the virtual environment. In aspects, the action can include opening an application or a website based on the URL, the IP address, the address identifying the destination computing device, transferring a user session from a client device to the mobile computing device based on the active user session data, or relocating a user avatar in the virtual environment to another location within the virtual environment, or initiating a payment.

In aspects, the rendering can occur from a perspective of a virtual camera controlled by the user. In aspects, the user can be a first user, the perspective can be a first perspective, and the virtual camera can be a first virtual camera. The system can further receive a video stream captured from a camera configured to capture the first user and map the video stream onto a model to generate an avatar of the first user positioned in the 3D environment according to the first perspective. From a second perspective of a second virtual camera controlled by a second user, the system can render the 3D virtual environment for display to the second user.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION

The Virtual Environment

Figure 1:
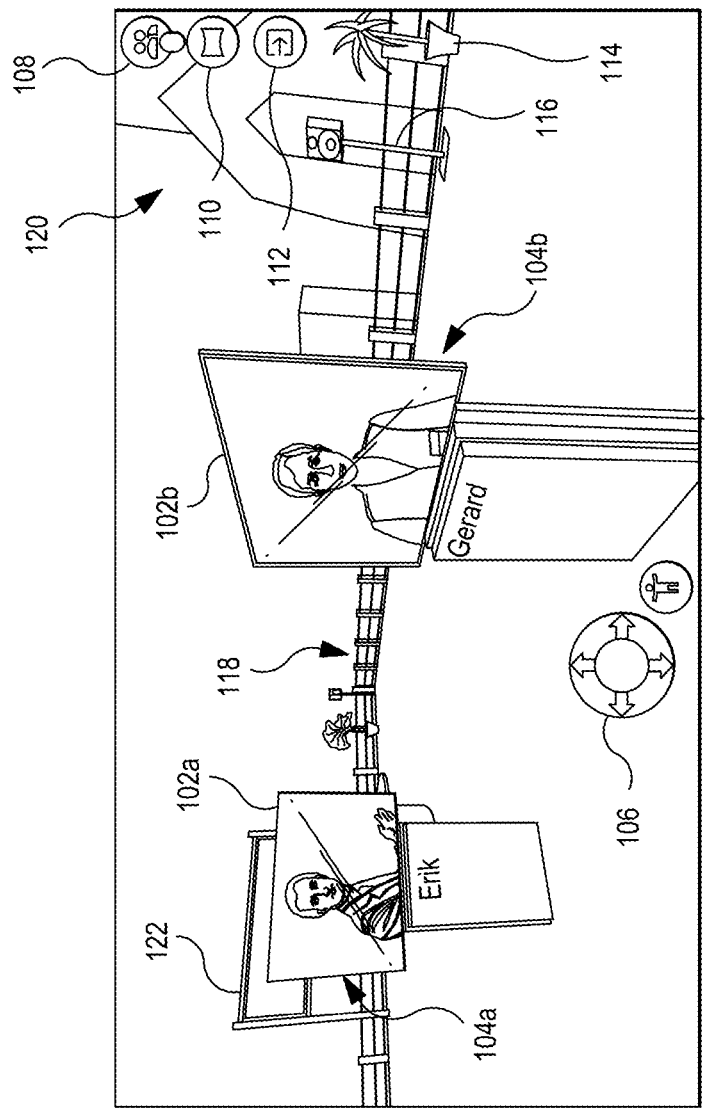
FIG. 1 is a diagram illustrating an example interface generated by the disclosed system, that shows a virtual environment with video streams being mapped onto avatars, according to aspects.

FIG. 1 is an example interface 100 generated by the disclosed system, that shows a virtual environment with video streams being mapped onto avatars, according to aspects. The interface 100 may be displayed to a participant or user of the system. For example, the participant or user may be using the system for a videoconference. It should be noted that while videoconferencing is the primary example illustrated throughout this disclosure, the virtual environment and the interface 100 may be used for other purposes. For example, the virtual environment and the interface 100 may be used in massively multiplayer online game (MMO) applications to display a game to a player, a virtual concert application to show an online concert to a concert goer, a virtual event application to show the event to an event goer, or generally as part of any software application designed to be used in the metaverse where a three-dimensional, immersive, interactive, and social experience is the goal of the application in which a user participates. A POSA will understand the applicability of the virtual environment and the interface 100 to various applications based on reading this disclosure.

Continuing with the videoconference example, in aspects, the interface 100 may be rendered for display to a participant of the videoconference, and may be constantly updated as the videoconference progresses. A user may control the orientation of their virtual camera using, for example, keyboard inputs, a gamepad controller, or touch screen inputs. In this way, the user can navigate around the virtual environment. In aspects, different inputs may change a virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard, gamepad controller, and mouse inputs, such as WASD keyboard keys to move the virtual camera forward, backward, left, or right on an X-Y plane, a space bar key to "hop" the virtual camera, and mouse movements specifying changes in pan and tilt angles. Alternatively, users can use a virtual joystick 106 shown on a display and which may be interacted with by the user to perform the same functions.

In aspects, the interface 100 includes avatars 102*a* and 102*b*, which each represent different participants to the videoconference. Avatars 102*a* and 102*b*, respectively, have texture mapped video streams 104*a* and 104*b* from devices of the first and second participant. A texture map is an image applied (mapped) to the surface of a shape or polygon. Here, the images are respective frames of the video. The camera devices capturing video streams 104*a* and 104*b* are positioned to capture faces of the respective participants. In this way, the avatars have texture mapped thereon, moving images of faces as participants in the meeting talk and listen.

Similar to how the virtual camera is controlled by the user viewing the interface 100, the location and direction of avatars 102*a* and 102*b* are controlled by the respective participants that they represent. Avatars 102*a* and 102*b* are 3D models represented by a mesh. Each avatar 102*a* and 102*b* may have the participant's name underneath the avatar.

The respective avatars 102*a* and 102*b* are controlled by the various users. They each may be positioned at a point corresponding to where their own virtual cameras are located within the virtual environment. Just as the user viewing the interface 100 can move around the virtual camera, the various users can move around their respective avatars 102*a* and 102*b*.

The virtual environment rendered in the interface 100 includes background image 120 and a 3D model 118 of an arena. The arena may be a venue or building in which the videoconference should take place. The arena may include a floor area bounded by walls. The 3D model 118 can include a mesh and texture. Other ways to mathematically represent the surface of 3D model 118 may be possible as well. For example, polygon modeling, curve modeling, and digital sculpting may be possible. For example, the 3D model 118 may be represented by voxels, splines, geometric primitives, polygons, or any other possible representation in 3D space. The 3D model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other 3D models that illustrate different components of the environment. For example, the virtual environment can include a decorative model 114, a speaker model 116, and a presentation screen model 122. Just as model 118, these models may be represented using any mathematical way to represent a geometric surface in three-dimensional space. These models may be separate from model 118 or combined into a single representation of the virtual environment.

Decorative models, such as decorative model 114, serve to enhance the realism and increase the aesthetic appeal of the arena. The speaker model 116 may virtually emit sound, such as presentation and background music. The presentation screen model 122 can serve to provide an outlet to present a presentation. Video of the presenter or a presentation screen share may be texture mapped onto the presentation screen model 122.

A button 108 may provide the user a list of participants. In one example, after a user selects the button 108, the user can chat with other participants by sending text messages, individually or as a group.

A further button 110 may enable a user to change attributes of the virtual camera used to render the interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110 degrees, which is commensurate with a wide-angle lens and human vision. However, selecting the further button 110 may cause the virtual camera to increase the field of view to exceed 170 degrees, commensurate with a fisheye lens. This may enable a user to have broader peripheral awareness of his or her surroundings in the virtual environment.

Finally, a still further button 112 can cause the user to exit the virtual environment. Selecting the still further button 112 may cause a notification to be sent to devices belonging to the other participants signaling to their devices to stop displaying the avatar corresponding to the user that has exited the virtual environment.

In this way, the interface 100's virtual 3D space is used to conduct video conferencing. Every user controls an avatar, which they can control to move around, look around, jump or do other things which change the position or orientation. A virtual camera shows the user the virtual environment and the other avatars. The avatars of the other users have, as an integral part, a virtual display, which shows the webcam image of the user.

By giving users a sense of space and allowing users to see each other's faces, aspects provide a more social experience than conventional web conferencing or conventional MMO gaming. That more social experience has a variety of applications. For example, it may be used in online shopping. For example, the interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guides, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching e-sports, watching performances captured using a 3D camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with 3D cameras, livestock shows, zoos, experiencing life as a tall/short/blind/deaf/white/black person (e.g., a modified video stream or still image for the virtual world to simulate the perspective that a user wishes to experience), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and a virtual trading floor/financial marketplace/stock market (e.g., integrating real-time data and video streams into the virtual world, real-time transactions and analytics), virtual locations people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., for military, law enforcement, firefighters, special ops), and making reservations (e.g., for a certain holiday home/car/etc.)

Figure 2:
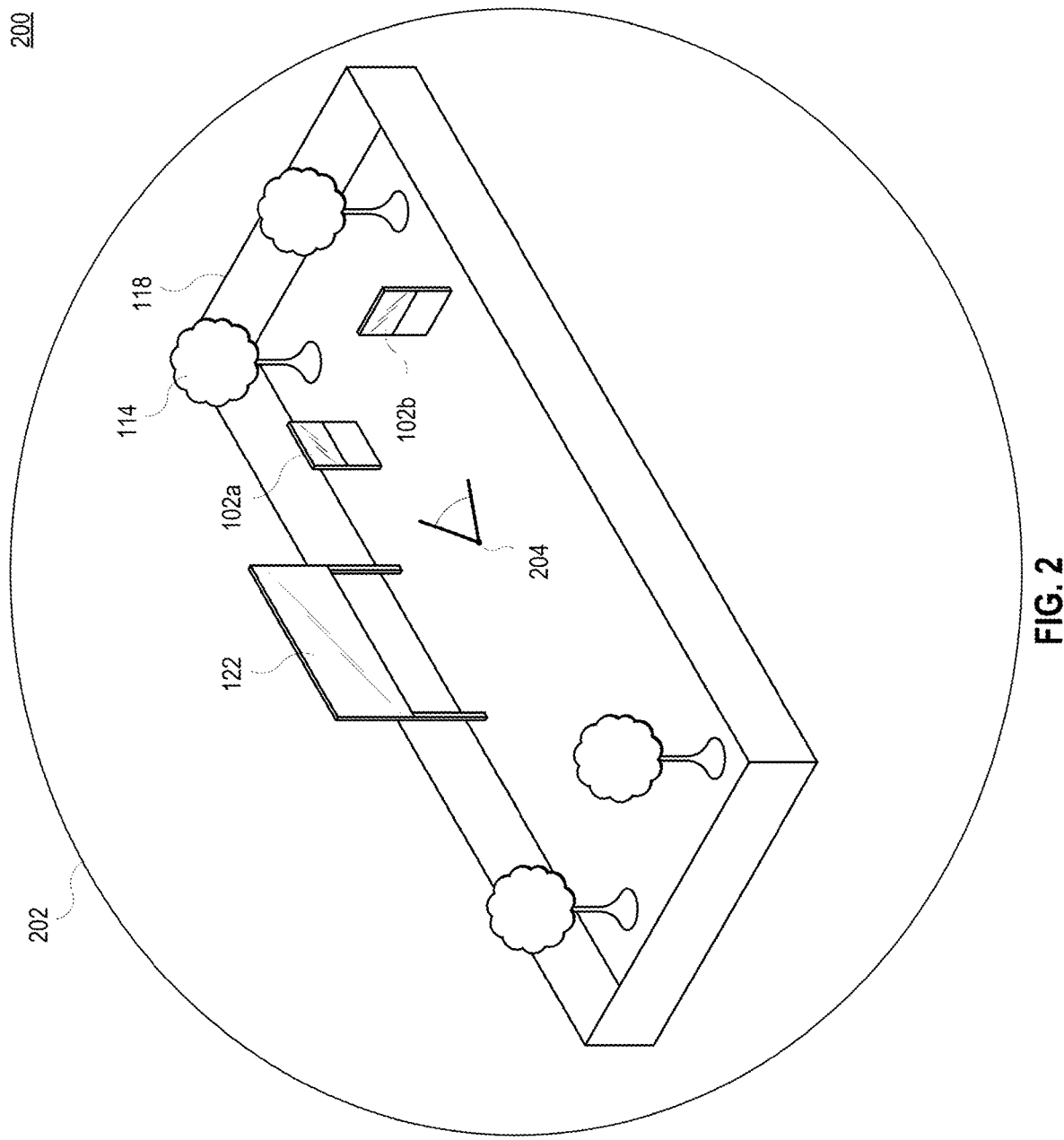
FIG. 2 is a diagram illustrating an example 3D model rendered in the virtual environment, according to aspects.

FIG. 2 is a diagram 200 illustrating an example 3D model rendered in the virtual environment, according to aspects. Just as illustrated in FIG. 1, the virtual environment here includes a 3D model 118 of an arena, and various 3D models, including 3D models 114 and 122. Also as illustrated in FIG. 1, diagram 200 includes avatars 102a and 102b navigating around the virtual environment.

As described above, interface 100 in FIG. 1 is rendered from the perspective of a virtual camera. That virtual camera is illustrated in diagram 200 as a virtual camera 204. As mentioned above, the user viewing interface 100 in FIG. 1 can control the virtual camera 204 and navigate the virtual camera 204 in 3D space. The interface 100 is constantly being updated according to the new position of the virtual camera 204 and any changes of the models within the field of view of the virtual camera 204. As described above, the field of view of the virtual camera 204 may be frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of the sphere 202 may be used to texture map the background image. In various alternative aspects, the shape may be a cylinder, cube, rectangular prism, or any other 3D geometry.

Figure 3:
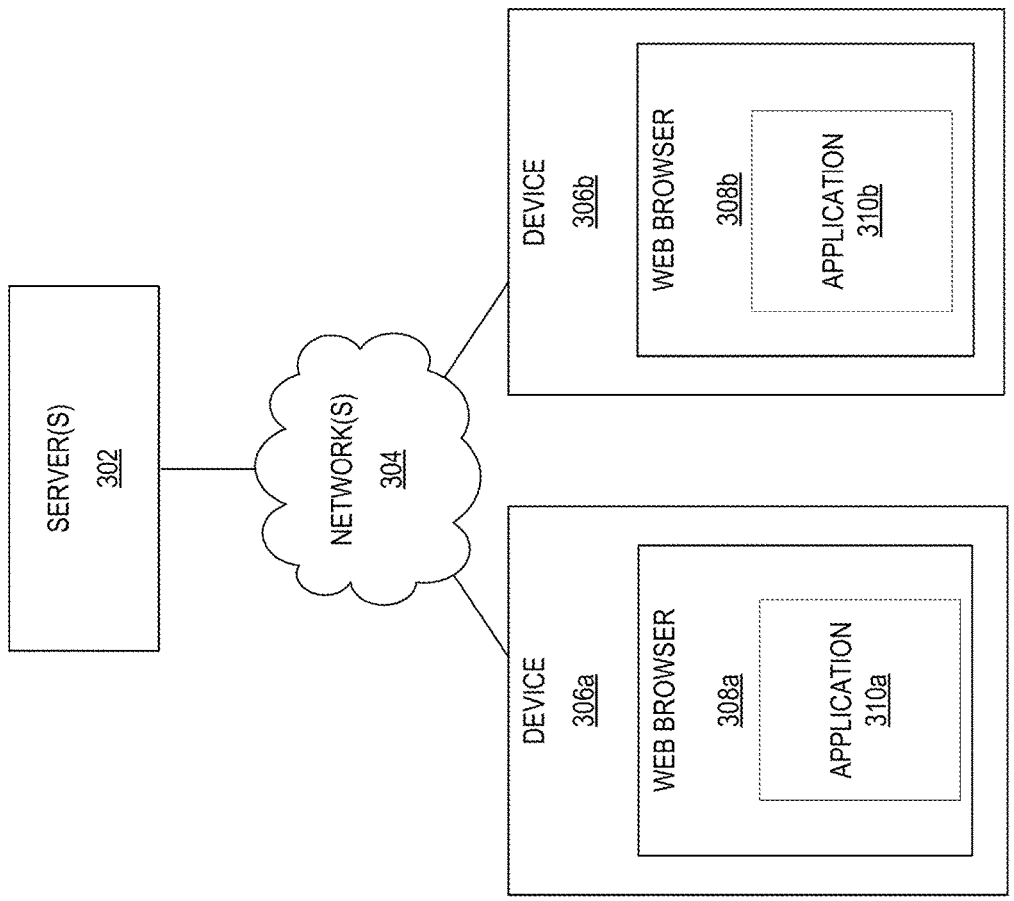
FIG. 3 is a diagram illustrating a high-level architecture of the system, according to aspects.

FIG. 3 is a diagram illustrating a high-level architecture 300 of the system, according to aspects. The architecture includes one or more servers 302 coupled to devices 306a and 306b via a network 304.

The servers 302 provide the services to connect a user session (e.g., a video conference, gaming, etc.) between devices 306a and 306b. As will be described in greater detail below, the servers 302 communicate notifications to devices of participants (e.g., devices 306a and 306b) when new participants join the virtual environment and when existing participants leave the virtual environment. The servers 302 communicate messages describing a position and direction in the virtual environment for respective participant's virtual cameras within the virtual environment. The servers 302 also communicate video and audio streams between the respective devices of the participants (e.g., devices 306a and 306b). Finally, the servers 302 store and transmit data describing data specifying the virtual environment to the respective devices 306a and 306b.

In addition to the data necessary for the virtual conference, the servers 302 may provide executable information that instruct the devices 306a and 306b on how to render the data to provide the interactivity in the virtual environment.

The servers 302 respond to requests with a response. The servers 302 may include a web server. A web server is software and hardware that uses HTTP (Hypertext Transfer Protocol) and other protocols to respond to client requests made over the World Wide Web. The main job of the web server is to display website content through storing, processing, and delivering web pages to users. The web server and its functionality will be discussed further below.

In an alternative aspect, communication between devices 306a and 306b happens not through the servers 302 but on a peer-to-peer basis. In that aspect, one or more of the data describing the respective participants' location and direction, the notifications regarding new and existing participants, and the video and audio streams of the respective participants are communicated not through server 302 but directly between devices 306a and 306b.

The network 304 enables communication between the various devices 306a and 306b and the servers 302. The network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

The devices 306a and 306b are each devices of respective participants to the virtual environment. The devices 306a and 306b each receive data necessary to conduct activities in the virtual environment such as a virtual conference and render the data necessary to provide the virtual conference. As will be described in greater detail below, the devices 306a and 306b include a display to present the rendered models, inputs that allow the user to control the virtual camera, a speaker (such as a headset) to provide audio to the user in the virtual environment, a microphone to capture a user's voice input, and a camera positioned to capture video of the user's face, etc.

The devices 306a and 306b may be any type of computing device, including a laptop, a desktop, a smartphone, a tablet computer, or a wearable computer (such as a smartwatch or a augmented reality or virtual reality headset).

Web browsers 308a and 308b can retrieve a network resource (such as a webpage) addressed by the link identifier (such as a uniform resource locator, or URL) and present the network resource for display. In particular, web browsers 308a and 308b are software applications for accessing information on the World Wide Web. Usually, web browsers 308a and 308b make this request using the hypertext transfer protocol (HTTP or HTTPS). When a user requests a web page from a particular web site, the web browsers 308a and 308b retrieve the necessary content from a web server, interpret and execute the content, and then display the page on a display on devices 306a and 306b shown as client/counterpart conference applications 310a and 310b. In examples, the content may have HTML and client-side scripting, such as JavaScript. Once displayed, a user can input information and make selections on the page, which can cause web browsers 308a and 308b to make further requests.

Applications 310a and 310b may be web applications downloaded from the servers 302 and configured to be executed by the respective web browsers 308a and 308b. In an aspect, The application 310a and 310b may be, for example conference applications. In aspects, Applications 310a and 310b may be JavaScript applications. In one example, applications 310a and 310b may be written in a higher-level language, such as a Typescript language, and translated or compiled into JavaScript. Applications 310a and 310b may be configured to interact with the WebGL JavaScript application programming interface. They may have control code specified in JavaScript and shader code written in OpenGL ES Shading Language (GLSL ES). Using the WebGL API, applications 310a and 310b may be able to utilize a graphics processing unit (not shown) of devices 306a and 306b. Moreover, OpenGL rendering of interactive 2D and 3D graphics without the use of plug-ins is also an option.

Applications 310a and 310b receive the data from the servers 302 describing position and direction of other avatars and 3D modeling information describing the virtual environment. In addition, applications 310a and 310b receive video and audio streams of other participants from the servers 302.

Applications 310a and 310b render 3D modeling data, including data describing the virtual environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the users use web browsers 308a and 308b to enter the virtual environment. The scene is displayed on the screen of the user. The webcam video stream and microphone audio stream of the user are sent to the servers 302. When other users enter the virtual environment, an avatar model is created for them. The position of this avatar is sent to the servers 302 and received by the other users. Other users also get a notification from the servers 302 that an audio/video stream is available. The video stream of a user is placed on the avatar that was created for that user. The audio stream is played back as coming from the position of the avatar.

Figure 4A:
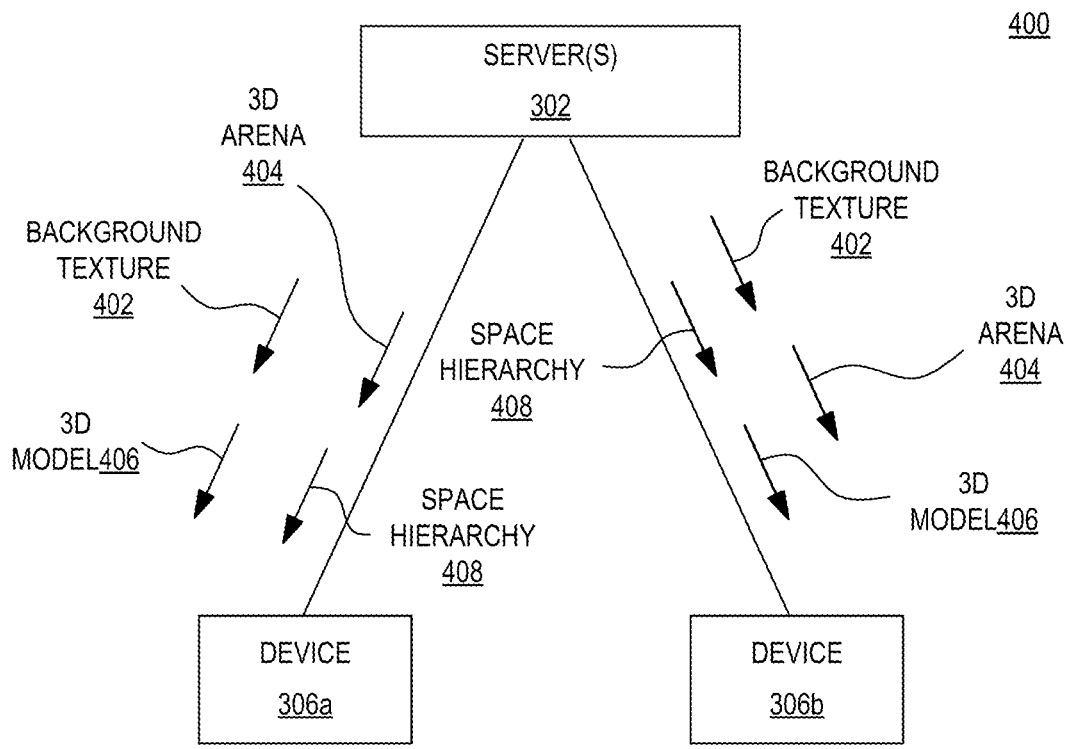
FIGS. 4A-C illustrate how data is transferred between various components of the system to provide communications between devices, according to aspects.
Figure 4B:
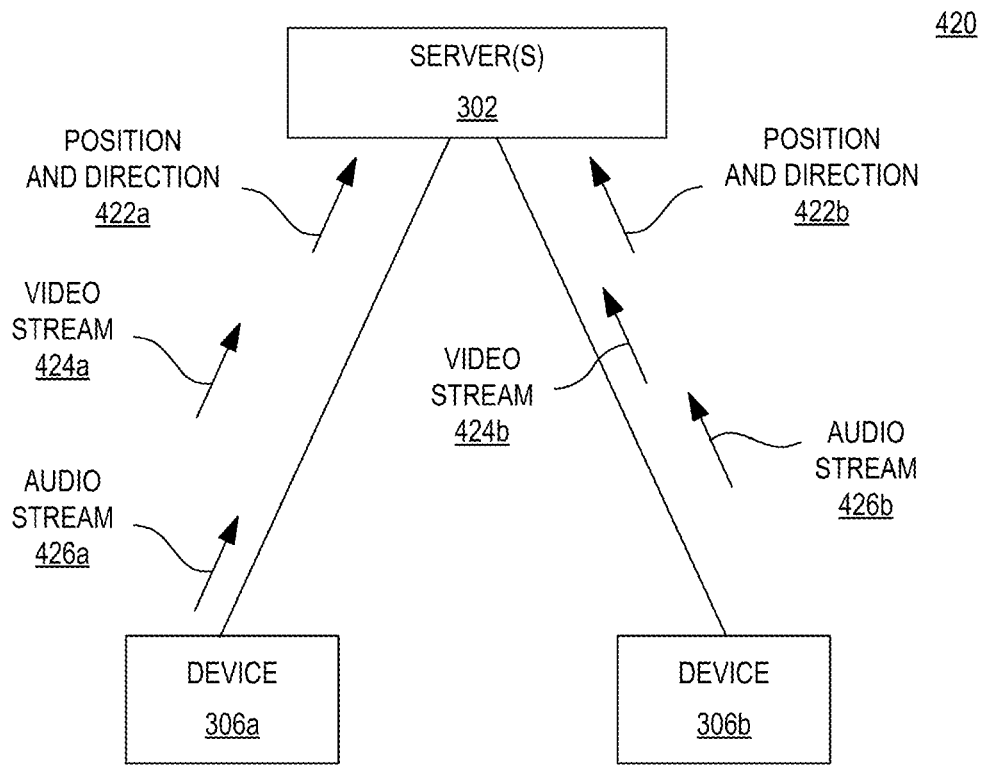
Figure 4C:
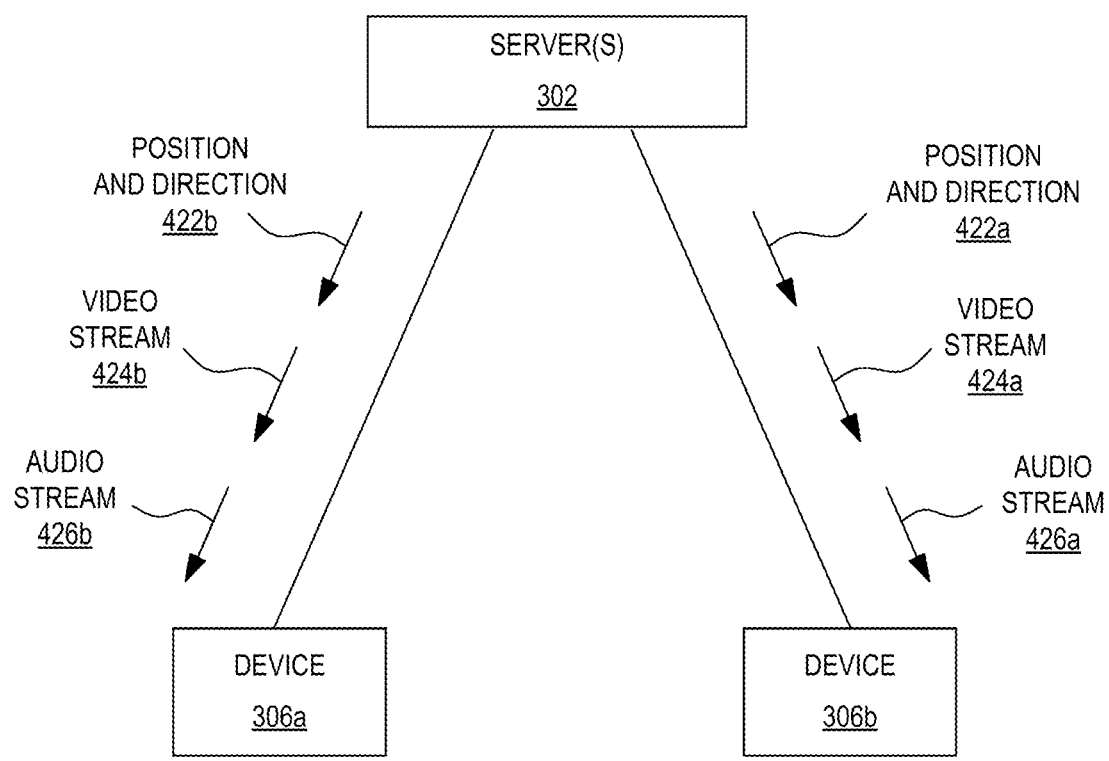

FIGS. 4A-C illustrate how data is transferred between various components of the system to provide communications between devices, according to aspects. Like in FIG. 3, each of FIGS. 4A-C depict the connection between the servers 302 and devices 306a and 306b. In particular, FIGS. 4A-C illustrate example data flows between those devices.

FIG. 4A illustrates a diagram 400 illustrating how the servers 302 transmit data describing the virtual environment to devices 306a and 306b. In particular, both devices 306a and 306b, receive from the servers 302 a 3D arena 404 (similar to the 3D arena 118 described with respect to FIG. 1), background texture 402, space hierarchy 408, and any other 3D modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

The 3D arena 404 is a 3D model of the space of the virtual environment (e.g., the space where the conference is to take place). As described above, it may include, for example, a mesh and possibly its own texture information to be mapped upon the 3D primitives it describes. It may define the space in which the virtual camera and respective avatars can navigate within the virtual environment. Accordingly, it may be bounded by edges (such as walls or fences) that illustrate to users the perimeter of the navigable virtual environment.

The space hierarchy 408 is data specifying partitions in the virtual environment. These partitions are used to determine how sound is processed before being transferred between participants. The partition data may be hierarchical and may describe sound processing to allow for areas where participants to have private conversations or side conversations.

The 3D model 406 is any other 3D modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how the servers 302 forwards information from one device to another. FIG. 4B illustrates a diagram 420 showing how the servers 302 receive information from respective devices 306a and 306b, and FIG. 4C illustrates a diagram 420 showing how the servers 302 transmit the information to respective devices 306b and 306a. In particular, device 306a transmits position and direction 422a, video stream 424a, and audio stream 426a to the servers 302, which transmits position and direction 422a, video stream 424a, and audio stream 426a to device 306b. And device 306b transmits position and direction 422b, video stream 424b, and audio stream 426b to the servers 302, which transmit position and direction 422b, video stream 424b, and audio stream 426b to device 306a.

The position and direction 422a and 422b describe the position and direction of the virtual camera for the user using device 306a. As described above, the position may be a coordinate in three-dimensional space (e.g., x, y, and z coordinate) and the direction may be a direction in three-dimensional space (e.g., pan, tilt, and roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422a and 422b each may include at least a coordinate on a horizontal plane in the virtual environment and a pan and tilt value. Alternatively or additionally, the user may be able to "jump" its avatar, so the Z position may be specified only by an indication of whether the user is jumping their avatar.

In different examples, position and direction 422a and 422b may be transmitted and received using HTTP request responses or using socket messaging.

Video streams 424a and 424b are video data captured from a camera of the respective devices 306a and 306b. The video may be compressed. For example, the video may use any commonly known video codecs, including MPEG-4, VP8, or H.264. The video may be captured and transmitted in real-time.

Similarly, audio streams 426a and 426b are audio data captured from a microphone of the respective devices. The audio may be compressed. For example, the video may use any commonly known audio codecs, including MPEG-4 or vorbis. The audio may be captured and transmitted in real-time. Video stream 424a and audio stream 426a are captured, transmitted, and presented synchronously with one another. Similarly, video stream 424b and audio stream 426b are captured, transmitted, and presented synchronously with one another.

The video streams 424a and 424b and audio streams 426a and 426b may be transmitted using the WebRTC application programming interface. The WebRTC is an API available in JavaScript. As described above, devices 306a and 306b download and run web applications, as conference applications 310a and 310b, and conference applications 310a and 310b may be implemented in JavaScript. Conference applications 310a and 310b may use WebRTC to receive and transmit video streams 424a and 424b and audio streams 426a and 426b by making API calls from its JavaScript.

As mentioned above, when a user leaves the virtual environment, this departure is communicated to all other users. For example, if device 306a exits the virtual environment, the servers 302 would communicate that departure to device 306b. Consequently, device 306b would stop rendering an avatar corresponding to device 306a, removing the avatar from the virtual space. Additionally, device 306b will stop receiving video stream 424a and audio stream 426a.

As described above, applications 310a and 310b may periodically or intermittently re-render the virtual space based on new information from respective video streams 424a and 424b, position and direction 422a and 422b, and new information relating to the virtual environment. For simplicity, each of these updates are now described from the perspective of device 306a. However, a skilled artisan would understand device 306b would behave similarly given similar changes.

As device 306a receives video stream 424b, device 306a texture maps frames from video stream 424a on to an avatar corresponding to device 306b. That texture mapped avatar is re-rendered within the virtual environment and presented to a user of device 306a.

As device 306a receives a new position and direction 422b, device 306a generates the avatar corresponding to device 306b positioned at the new position and oriented in the new direction. The generated avatar is re-rendered within the virtual environment and presented to the user of device 306a.

In some aspects, the servers 302 may send updated model information describing the virtual environment. For example, the servers 302 may send updated information 402, 404, 406, or 408. When that happens, device 306a will re-render the virtual environment based on the updated information. This may be useful when the environment changes over time. For example, an outdoor event may change from daylight to dusk as the event progresses.

Again, when device 306b exits the virtual environment, the servers 302 send a notification to device 306a indicating that device 306b is no longer participating. In that case, device 306a would re-render the virtual environment without the avatar for device 306b.

While FIG. 3 and FIGS. 4A-C are illustrated with two devices for simplicity, a POSA would understand that the techniques described herein may be extended to any number of devices. In an aspect, the data transferred in FIG. 4A may come from one network address for the servers 302, while the data transferred in FIGS. 4B-C may be transferred to/from another network address for the servers 302.

In one aspect, participants can set their webcam, microphone, speakers and graphical settings before entering the virtual environment. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Use of Optical Labels in the Virtual Environment

Figure 5:
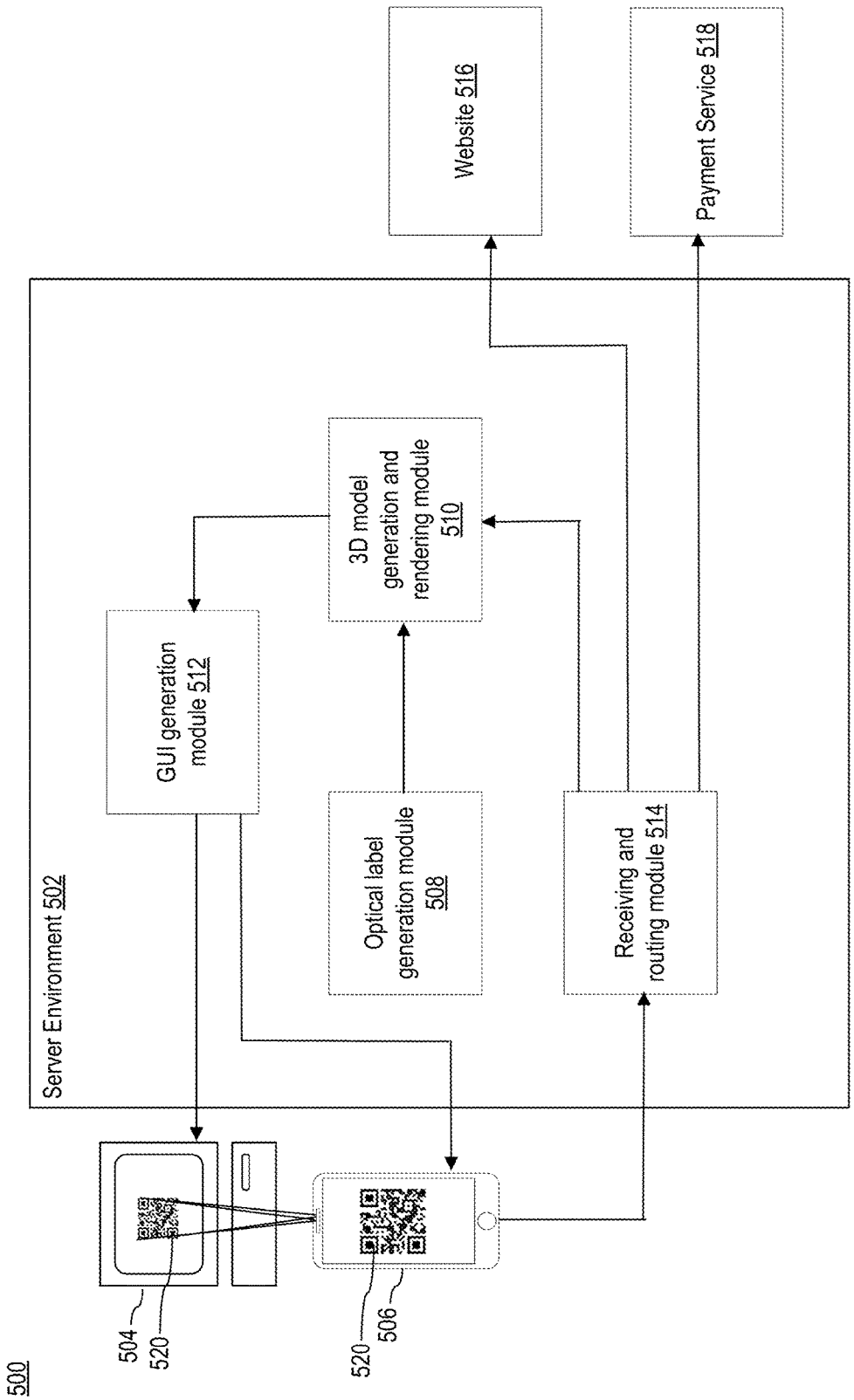
FIG. 5 is an example flow diagram of how the virtual optical labels are generated and used in the system, according to aspects.

FIG. 5 is an example flow diagram 500 of how the virtual optical labels are generated and used by the system, according to aspects. In aspects, the servers described with respect to FIG. 3 and FIGS. 4A-C can operate within a server environment 502. The server environment 502 may be comprised of a variety of centralized or decentralized servers 302 described with respect to FIG. 3 and FIGS. 4A-C. For example, the servers 302 may be mobile devices, laptop computers, desktop computers, grid-computing resources, virtualized computing resources, cloud-computing resources, peer-to-peer distributed computing devices, a server farm, or a combination thereof. The server environment 502 may also be a cloud-computing environment. The cloud-computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud environment similar to a public cloud with the exception that it is operated solely for a single organization. The servers 302 of the server environment 502 may be centralized in a single room, distributed across different rooms, distributed across different geographic locations, or embedded within the network 304 of FIG. 3.

In aspects, the servers 302 can have one or more modules installed thereon to enable the use of optical labels within the virtual environment. In aspects, these modules can include an optical label generation module 508, a 3D model generation and rendering module 510, a GUI generation module 512, and a receiving and routing module 514. How these modules enable the functioning of the system will now be described.

In aspects, the optical label generation module 508 can implement software that when executed by one or more computing devices (e.g., processors) of the servers 302, can generate a virtual optical label 520 with embedded data. The virtual optical label 520 may be any one of a barcode, a QR code, a SnapTag, or any other scannable label generated to be used in the virtual environment. As such, the virtual optical label 520 may be a CGI for use in the virtual environment.

In aspects, once the optical label generation module 508 generates the virtual optical label 520, the virtual optical label 520 may be transmitted to the 3D model generation and rendering module 510. The 3D model generation and rendering module 510 can implement software that when executed can render the 3D models described with respect to FIG. 1 and FIG. 2 above. In aspects, the 3D model generation and rendering module 510, when rendering the various 3D models, can also incorporate the virtual optical label 520 onto a 3D model. For example, if the 3D model generation and rendering module 510 renders a virtual environment that is a restaurant, and the restaurant can have rendered 3D models of furniture, walls, art, merchandise, etc. that the virtual optical label 520 may be incorporated with. The aforementioned is given as an example. Similarly, if the 3D model generation and rendering module 510 renders a game level of a MMO, the game level can have 3D models of characters, gaming items, scenery, etc. that the virtual optical label 520 may be incorporated with. A POSA reading this disclosure will understand what other 3D models the virtual optical label 520 may be incorporated into.

In aspects, the virtual optical label 520 can include embedded data. The embedded data may be static or dynamic (i.e., can change based on circumstances or settings of the virtual environment, or settings provided by external users or services). The embedded data may be any data that may be represented as digital information using the widths, spacing of lines, shapes, dots, and other patterns of the virtual optical label 520. In aspects, this data can include a uniform resource locator (URL), an IP address, an address identifying a destination computing device, or active user session data of a user of the virtual environment. These are exemplary and a POSA reading this disclosure will know what other types of data may be embedded into the virtual optical label 520.

In aspects, the data embedded into the virtual optical label 520 can relate to the 3D model on which it is incorporated. For example, if the 3D model is a piece of virtual furniture that has a corresponding real-world physical equivalent, the virtual optical label 520 can have information regarding the manufacturer, make, model number, price, link for purchase, etc. of that piece of furniture. In another example, if the 3D model is a virtual representation of a food at a virtual restaurant or market rendered by the system, the virtual optical label 520 may be affixed to the virtual representation of the food and have data regarding ingredients, calories, a link to order the food from the nearest real-world equivalent restaurant or market, etc.

In other aspects, the embedded data does not have to relate to the 3D model but may be affixed to the 3D model such that when the virtual optical label 520 is scanned by a user using a device (such as a mobile device) some type of action may be performed. For example, in the example where the virtual environment is a game level of an MMO, the embedded data may be incorporated into a 3D model of an object on that game level (e.g., a virtual wall, a virtual sign, etc.) and when scanned can perform an action such as transporting a user avatar to another level of the MMO, transferring an active user session to a device that scanned the virtual optical label 520, or performing some type of transaction, such as initiating a payment in return for a virtual or real-world item. How the embedded data is used will be discussed further below.

Continuing with the flow diagram 500, once the 3D model generation and rendering module 510 performs its functions, and the virtual optical label 520 is incorporated into a 3D model of the virtual environment, the 3D model and other models generated for the virtual world may be transmitted to the GUI generation module 512. The GUI generation module 512 can implement software that can stitch together or assemble the various 3D models into a scene of the virtual environment and present that scene to a user on a GUI of a client device 504. The GUI generation module 512 can include software of any graphics engine or game engine that can enable the generation of the scene of the virtual environment.

In aspects, once the 3D model is presented to a user on the GUI of the client device 504, it may be scanned by a user of the virtual environment. In aspects, the virtual optical label 520 may be scanned by a user with devices with scanning capabilities or cameras to perform some of the aforementioned functions. For example, a user can scan the virtual optical label 520 with a mobile device 506 using the mobile device's 506 camera and an application (e.g., applications 310a or 310b of FIG. 3). In aspects, the application may be a camera application or a custom application build for a scanning device that can enable taking pictures, scans, and/or the decoding of the embedded data and/or can extract the embedded data from the virtual optical label 520 and forward that data back to the system so that the system can determine what action to take for the user based on the embedded data.

For example, in aspects, if the embedded data is a URL, IP address, or address identifying a destination computing device, the application create a scanned image of the virtual optical label 520 and/or can extract that information and transmit that information back to the system so that the system can forward a user to a website associated with the URL (e.g., website 516) or the computing device associated with the IP address or address identifying the computing device. In aspects, it the embedded data is active user session data of a user of the virtual environment, the application can extract that data, which can include information about what room/level/environment that the user is currently in, any user settings, any environmental settings, etc. of the virtual environment and can forward that information to the system so that the system can transfer a user session to the mobile device 506.

In aspects, if the embedded data is information about a 3D object, such as a food, furniture, art, etc. the application can also extract that data and pass it to the system so that the system can display it to the user. For example, for a particular virtual food item, the system can display the ingredients, the name of the food, recipes on how to make the food, where to order the food from, the price, etc. For a virtual furniture item, the system can display the make and model, the price, where a user can purchase the item, etc. For a virtual art item, the system can display the artist, the price, options to purchase the art either digitally or as a physical art piece (e.g., a non-fungible token (NFT) version or a real-life physical version), etc.

In aspects, the embedded data can also be data that can enable a payment or transaction. For example, and as previously indicated, the virtual optical label 520 may be associated with a virtual item in a MMO. The embedded data can have payment related information such that a user can scan the virtual optical label 520 and initiate a payment or transaction to purchase that item. For example, the optical label 520 can integrate with a payment service 518 to facilitate a transaction using fiat currency, virtual currency, crypto-currencies, tokens, credits, coupons, etc. The payment service 518 may be a brokerage, a bank, a payment service provider, a digital wallet, etc. that can enable the transaction. Similarly, purchases may be made from virtual stores in the virtual environment for items represented digitally. For example, if a virtual department store has items and a user is browsing items in the store, by scanning the virtual optical label for an item, a purchase may be made for either the virtual or real-life version of the item, which may be facilitated by the payment service 518.

In aspects, the scanned image of the virtual optical label 520 may be transmitted by the application, along with any other information extracted, to the system and received via a receiving and routing module 514. The receiving and routing module 514 can implement software that enables the receipt of the scanned virtual optical label 520. The receiving and routing module 514 can also enable the decision making capabilities of what the system is to do with the embedded information of the virtual optical label 520. For example, the receiving and routing module 514 can have computer-implemented logic that enables the processing of the embedded data to determine where and to what modules, devices, or services to route the embedded information. For example, if the embedded information is a URL, IP address, or address of a destination computing device, the receiving and routing module 514 can perform the routing to that particular URL, IP address, or destination computing device.

If the embedded data is related to a payment, the receiving and routing module 514 an forward the payment and transaction data to the payment service 518 to complete the payment transfer. If the embedded data relates to transferring the user session from one device to another, the receiving and routing module 514 can forward user session information to the 3D model generation and rendering module 510 and GUI generation module 512 to render a copy of the virtual environment or generate a version of the virtual environment that is compatible with the device that the user session is being transferred to. For example, if the device is the mobile device 506, a version of the virtual environment may be generated that is compatible with a browser, operating system, or display of the mobile device 506.

In aspects, and using similar principles, scanning the virtual optical label 520 can result in the transportation/relocation of a user avatar (e.g., avatars 102a and 102b described in FIG. 1), to another location within the virtual environment. In this way, users can navigate the virtual environment without having to scroll through the map and/or manually navigate the virtual environment. Thus, the virtual optical label 520 may be used as a navigation tool of the virtual environment. Alternatively, scanning the virtual optical label can result in a map of the virtual environment to be displayed to a user. In aspects, the user can click on portions of the map to have his or her avatar be relocated to that portion of the map.

In aspects, the receiving and routing module 514 may be the module that extracts the embedded data of the virtual optical label instead of the application. For example, in aspects, the application of the mobile device 506 can scan an image of the virtual optical label 520 and transmit it to the receiving and routing module 514. The receiving and routing module 514 can then perform an optical character recognition (OCR) on the virtual optical label 520 to extract the embedded data. Once the embedded data is extracted (i.e., converted from the dashes, shapes, dots, and lines of the virtual optical label 520 to information such as URLs, user settings, payment information, etc.), the receiving and routing module 514 can determine, based on its decisioning logic, what to do with that embedded data.

The flow diagram 500 is exemplary of how the system can generate and use virtual optical labels in a virtual environment. A POSA reading this disclosure will understand variations of how to generate and use the virtual optical labels. The disclosed system, methods, and operations described herein provide a novel use of optical labels. The novel use is to virtualize optical labels and use them in a virtual environment. The virtual optical labels may be used for various functions within the virtual environment or to perform some actions. For example, when scanned and processed, the virtual optical labels may be used to navigate users within the virtual environment; may be used to forward users of the virtual environment to external websites or services (e.g., website 516 or payment service 518) to perform an action, such as purchase a good or service, conduct a payment transaction, obtain further information about an object, obtain information about a topic, etc.; and to be used to exchange information, etc. Current systems do not incorporate optical labels to perform such functions.

The use of optical labels in this manner can help provide a more optimal experience for users of virtual environments. For example, in the use case where the virtual optical labels are used to navigate the virtual world, computing resources may be preserved by having a user be directly transported to a certain location, thus avoiding the need to render the virtual environment, including connecting and disconnecting audio and video feeds if the user were to manually navigate to that location. Thus, computing resources (processing and memory) are optimized.

Additionally, the use of virtual optical labels can open new possibilities for virtual worlds and interconnect both the physical and virtual worlds. For example, replicas of real-world storefronts, supermarkets, etc. may be generated in the virtual world. In aspects, these may be presented to users that may not have access to these storefronts, supermarkets, etc. For example, a user in a remote rural area may not have access to a Louis Vuitton store. However, via the virtual environment, the user can have access to a virtualized version of the store and obtain the same browsing experience as a person entering a physical store. This includes interacting with avatars of store representatives that can be talked to and interacted with in real-time. The user of the virtual environment can then browse items in a similar fashion, and use the virtual optical labels affixed to items in the virtual store to obtain information or perform transactions to purchase items. In this way, users can have lifelike experiences that they may not have had absent the use of the virtual environment in conjunction with the virtual optical labels. A POSA reading this disclosure will appreciate the further benefits of the disclosed system, methods, and operations.

Methods of Operating the System

Figure 6:
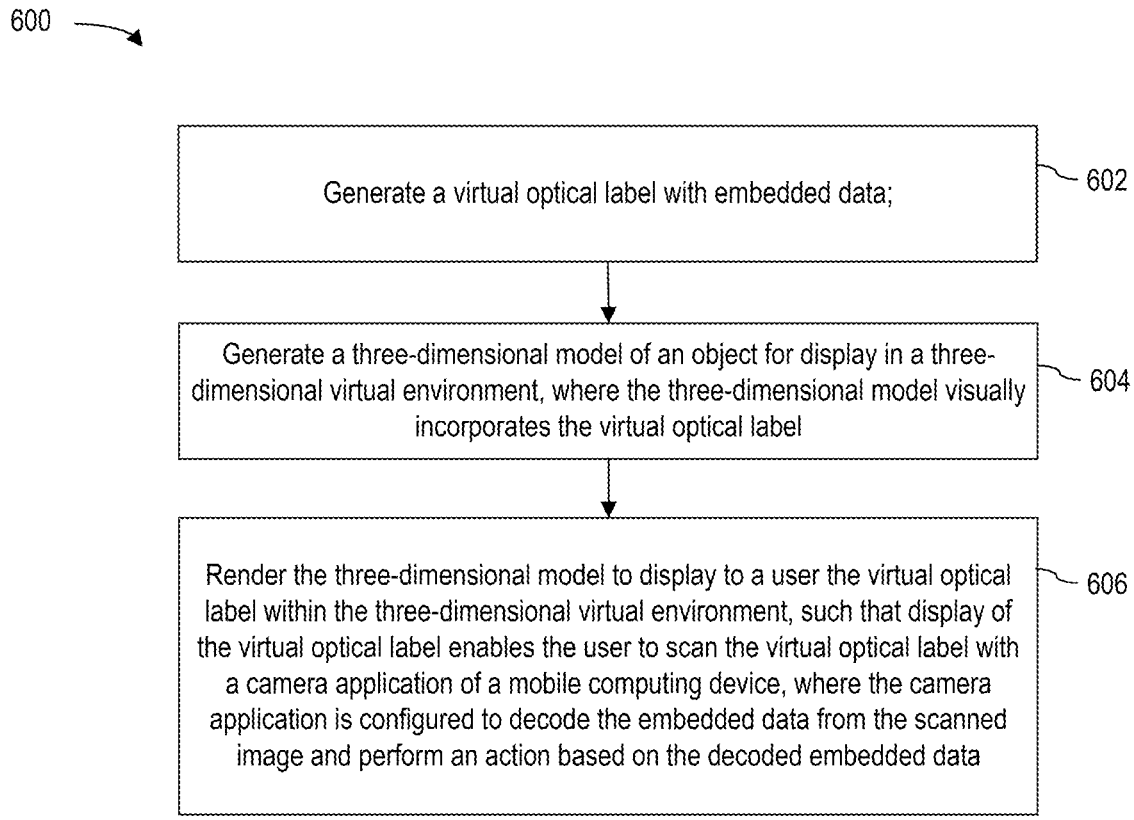
FIG. 6 is an example method of operating the system to enable the use of optical labels in the virtual environment, according to aspects.

FIG. 6 is an example method 600 of operating the system to enable the use of optical labels in the virtual environment, according to aspects. Method 600 may be performed using the servers, modules, and devices described with respect to FIGS. 1-5. In aspects, method 600 may begin, as shown in step 602, by first generating a virtual optical label (e.g., virtual optical label 520 of FIG. 5) with embedded data. As shown in step 604, the system can also generate a three-dimensional (3D) model of an object for display in a 3D virtual environment, where the 3D model visually incorporates the virtual optical label. As shown in step 606, the 3D model is rendered to display to a user the virtual optical label within the 3D virtual environment, such that display of the virtual optical label enables the user to scan the virtual optical label with a camera application of a mobile computing device, where the camera application is configured to decode the embedded data from the scanned image and perform an action based on the decoded embedded data.

In aspects, the embedded data can include a uniform resource locator (URL), an IP address, an address identifying a destination computing device, or active user session data of a user of the virtual environment. In aspects, the action can include opening an application or a website based on the URL, the IP address, the address identifying the destination computing device, transferring a user session from a client device to the mobile computing device based on the active user session data, or relocating a user avatar in the virtual environment to another location within the virtual environment, or initiating a payment.

In aspects, the rendering can occur from a perspective of a virtual camera controlled by the user. In aspects, the user can be a first user, the perspective can be a first perspective, and the virtual camera can be a first virtual camera. The system can further receive a video stream captured from a camera configured to capture the first user and map the video stream onto a model to generate an avatar of the first user positioned in the 3D environment according to the first perspective. From a second perspective of a second virtual camera controlled by a second user, the system can render the 3D virtual environment for display to the second user.

The operation of method 600 may be performed by the system in accordance with aspects described above.

Components of the System

Figure 7:
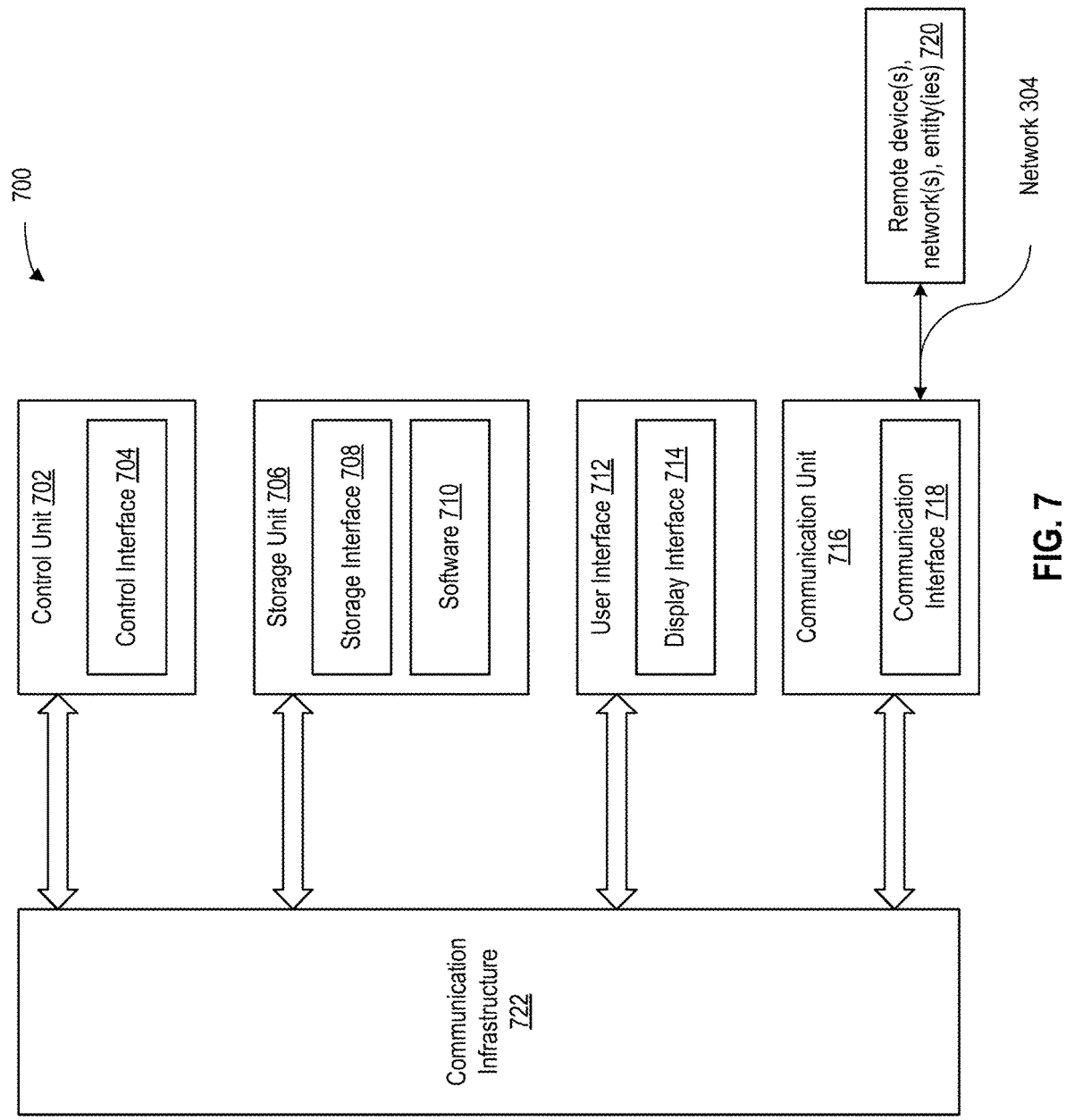
FIG. 7 is an example architecture of the components of the client devices and servers implementing the system, according to aspects.

FIG. 7 is an example architecture 700 of the components of the client devices (e.g., client device 504 and mobile device 506 of FIG. 5, or devices 306a and 306b) and servers (e.g., servers 302 of FIG. 3) implementing the system, according to aspects. In aspects, the components may include a control unit 702, a storage unit 706, a communication unit 716, and a user interface 712. The control unit 702 may include a control interface 704. The control unit 702 may execute a software 710 to provide some or all of the intelligence of the system. The control unit 702 may be implemented in a number of different ways. For example, the control unit 702 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof The control interface 704 may be used for communication between the control unit 702 and other functional units or devices of the system. The control interface 704 may also be used for communication that is external to the functional units or devices of the system. The control interface 704 may receive information from the functional units or devices of the system, or from remote devices 720, or may transmit information to the functional units or devices of the system, or to remote devices 720. The remote devices 720 refer to units or devices external to the system.

The control interface 704 may be implemented in different ways and may include different implementations depending on which functional units or devices of the system or remote devices 720 are being interfaced with the control unit 702. For example, the control interface 704 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 704 may be connected to a communication infrastructure 722, such as a bus, to interface with the functional units or devices of the system or remote devices 720.

The storage unit 706 may store the software 710. For illustrative purposes, the storage unit 706 is shown as a single element, although it is understood that the storage unit 706 may be a distribution of storage elements. Also for illustrative purposes, the storage unit 706 is shown as a single hierarchy storage system, although it is understood that the storage unit 706 may be in a different configuration. For example, the storage unit 706 may be formed with different storage technologies forming a memory hierarchical system including different levels of caching, main memory, rotating media, or off-line storage. The storage unit 706 may be a volatile memory, a nonvolatile memory, an internal memory, an external memory, or a combination thereof. For example, the storage unit 706 may be a non-volatile storage such as nonvolatile random access memory (NVRAM), Flash memory, or disk storage, or a volatile storage such as static random access memory (SRAM) or dynamic random access memory (DRAM).

The storage unit 706 may include a storage interface 708. The storage interface 708 may be used for communication between the storage unit 706 and other functional units or devices of the system. The storage interface 708 may also be used for communication that is external to the system. The storage interface 708 may receive information from the other functional units or devices of the system or from remote devices 720, or may transmit information to the other functional units or devices of the system or to remote devices 720. The storage interface 708 may include different implementations depending on which functional units or devices of the system or remote devices 720 are being interfaced with the storage unit 706. The storage interface 708 may be implemented with technologies and techniques similar to the implementation of the control interface 704.

The communication unit 716 may enable communication to devices, components, modules, or units of the system or to remote devices 720. For example, the communication unit 716 may permit the system to communicate between its components the client devices (e.g., devices 306a, 306b, 504, and 506), and the servers 302. The communication unit 716 may further permit the devices of the system to communicate with remote devices 720 such as an attachment, a peripheral device, or a combination thereof through the network 304.

As previously indicated, the network 304 may span and represent a variety of networks and network topologies. For example, the network 304 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 304. Cable, Ethernet, digital subscriber line (DSL), fiber optic lines, fiber to the home (FTTH), and plain old telephone service (POTS) are examples of wired communication that may be included in the network 304. Further, the network 304 may traverse a number of network topologies and distances. For example, the network 304 may include direct connection, personal area network (PAN), local area network (LAN), metropolitan area network (MAN), wide area network (WAN), or a combination thereof The communication unit 716 may also function as a communication hub allowing system to function as part of the network 304 and not be limited to be an end-point or terminal unit to the network 304. The communication unit 716 may include active and passive components, such as microelectronics or an antenna, for interaction with the network 304.

The communication unit 716 may include a communication interface 718. The communication interface 718 may be used for communication between the communication unit 716 and other functional units or devices of the system or to remote devices 720. The communication interface 718 may receive information from the other functional units or devices of the system, or from remote devices 720, or may transmit information to the other functional units or devices of the system or to remote devices 720. The communication interface 718 may include different implementations depending on which functional units or devices are being interfaced with the communication unit 716. The communication interface 718 may be implemented with technologies and techniques similar to the implementation of the control interface 704.

The user interface 712 may present information generated by system. In aspects, the user interface 712 allows a user to interface with the devices of the system or remote devices 720. The user interface 712 may include an input device and an output device. Examples of the input device of the user interface 712 may include a keypad, buttons, switches, touchpads, soft-keys, a keyboard, a mouse, or any combination thereof to provide data and communication inputs. Examples of the output device may include a display interface 714. The control unit 702 may operate the user interface 712 to present information generated by system. The control unit 702 may also execute the software 710 to present information generated by system, or to control other functional units of the system. The display interface 714 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, passive devices, or a combination thereof. Further, if a module or unit is written in the system or apparatus claims, the module or unit is deemed to include hardware circuitry for the purposes and the scope of the system or apparatus claims.

The modules and units in the aforementioned description of the aspects may be coupled to one another as described or as shown. The coupling may be direct or indirect, without or with intervening items between coupled modules or units. The coupling may be by physical contact or by communication between modules or units.

The terms "service" or "services" referred to herein can include a collection of modules or units. A collection of modules or units may be arranged, for example, in software or hardware libraries or development kits in an aspect of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface to facilitate the execution of functions of the system.

The above detailed description and aspects of the disclosed system are not intended to be exhaustive or to limit the disclosed system to the precise form disclosed above. While specific examples for system are described above for illustrative purposes, various equivalent modifications are possible within the scope of the disclosed system, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting system and method 600 is cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing system, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method comprising:
generating, by one or more computing devices, a virtual optical label with embedded data;
generating a three-dimensional model of an object for display in a three-dimensional virtual environment, wherein the three-dimensional model is rendered to incorporate the virtual optical label; and
displaying the three-dimensional model in the three-dimensional virtual environment to a user of the three-dimensional virtual environment such that when the user scans the virtual optical label incorporated with the three-dimensional model with a camera application of a mobile computing device, the camera application is configured to decode the embedded data from the scanned image and perform an action based on the decoded embedded data.

2. The method of claim 1, wherein the embedded data comprises a uniform resource locator (URL), an IP address, or an address identifying a destination computing device.

3. The method of claim 2, wherein the action comprises opening an application or a website based on the URL, the IP address, or the address identifying the destination computing device.

4. The method of claim 1, wherein the embedded data comprises active user session data of the user of the three-dimensional virtual environment.

5. The method of claim 4, wherein the action comprises transferring a user session from a client device to the mobile computing device based on the active user session data.

6. The method of claim 1, wherein the action comprises relocating a user avatar in the three-dimensional virtual environment to another location within the three-dimensional virtual environment.

7. The method of claim 1, wherein the action comprises initiating a payment.

8. The method of claim 1, wherein the rendering occurs from a perspective of a virtual camera controlled by the user.

9. The method of claim 8, wherein the user is a first user, the perspective is a first perspective, and the virtual camera is a first virtual camera, further comprising:
receiving a video stream captured from a camera configured to capture the first user;
mapping the video stream onto a model to generate an avatar of the first user positioned in the three-dimensional virtual environment according to the first perspective;
from a second perspective of a second virtual camera controlled by a second user, rendering the three-dimensional virtual environment for display to the second user.

10. A non-transitory computer readable medium including instructions, that when executed by a computing system cause the computing system to perform operations comprising:
generating, by one or more computing devices, a virtual optical label with embedded data;
generating a three-dimensional model of an object for display in a three-dimensional virtual environment, wherein the three-dimensional model is rendered to incorporate the virtual optical label; and
displaying the three-dimensional model in the three-dimensional virtual environment to a user of the three-dimensional virtual environment such that when the user scans the virtual optical label incorporated with the three-dimensional model with a camera application of a mobile computing device the camera application is configured to decode the embedded data from the scanned image and perform an action based on the decoded embedded data.

11. The non-transitory computer readable medium of claim 10, wherein the embedded data comprises a uniform resource locator (URL), an IP address, or an address identifying a destination computing device.

12. The non-transitory computer readable medium of claim 11, wherein the action comprises opening an application or a website based on the URL, the IP address, or the address identifying the destination computing device.

13. The non-transitory computer readable medium of claim 10, wherein the embedded data comprises active user session data of the user of the three-dimensional virtual environment.

14. The non-transitory computer readable medium of claim 13, wherein the action comprises transferring a user session from a client device to the mobile computing device based on the active user session data.

15. The non-transitory computer readable medium of claim 10, wherein the action comprises relocating a user avatar in the three-dimensional virtual environment to another location within the three-dimensional virtual environment.

16. The non-transitory computer readable medium of claim 10, wherein the action comprises initiating a payment.

17. The non-transitory computer readable medium of claim 10, wherein the rendering occurs from a perspective of a virtual camera controlled by the user.

18. The non-transitory computer readable medium of claim 17, wherein the user is a first user, the perspective is a first perspective, and the virtual camera is a first virtual camera, the operations further comprising:
receiving a video stream captured from a camera configured to capture the first user;
mapping the video stream onto a model to generate an avatar of the first user positioned in the three-dimensional virtual environment according to the first perspective;
from a second perspective of a second virtual camera controlled by a second user, rendering the three-dimensional virtual environment for display to the second user.

19. A computing system comprising:
a memory configured to store instructions;
one or more processors, coupled to the memory, configured to process the stored instructions to:
generate a virtual optical label with embedded data;
generate a three-dimensional model of an object for display in a three-dimensional virtual environment, wherein the three-dimensional model is rendered to incorporate the virtual optical label; and displaying the three-dimensional model in the three-dimensional virtual environment to a user of the three-dimensional virtual environment, such that when the user scans the virtual optical label incorporated with the three-dimensional model with a camera application of a mobile computing device, the camera application is configured to decode the embedded data from the scanned image and perform an action based on the decoded embedded data.

20. The computing system of claim 19, wherein the embedded data comprises a uniform resource locator (URL), an IP address, or an address identifying a destination computing device.

* * * * *